United States Patent [19]

Masuda

[11] Patent Number: 4,919,988
[45] Date of Patent: Apr. 24, 1990

[54] INFORMATION RECORDING MEDIUM AND PROCESS FOR PRODUCING THE SAME

[75] Inventor: Toshiyuki Masuda, Shizuoka, Japan

[73] Assignee: Fuji Photo Film Co., Ltd., Minami-ashigari, Japan

[21] Appl. No.: 173,814

[22] Filed: Mar. 28, 1988

[30] Foreign Application Priority Data

Mar. 26, 1987 [JP] Japan ................................ 62-72764
Apr. 6, 1987 [JP] Japan ................................ 62-84114

[51] Int. Cl.$^5$ ............................................. B32B 3/02
[52] U.S. Cl. ........................................ 428/64; 428/65;
428/913; 369/283; 346/76 L; 346/135.1;
156/60; 156/242; 156/244.22; 156/244.27;
264/104; 264/106
[58] Field of Search ........................... 428/64, 65, 913;
369/283; 346/76 L, 135.1; 156/60, 242, 244.22,
244.27; 264/104, 106

[56] References Cited

U.S. PATENT DOCUMENTS 4,672,600 6/1987 Bolston et al. ...................... 369/283

FOREIGN PATENT DOCUMENTS 0256936 12/1985 Japan ................................ 369/283
1296547 12/1986 Japan ................................ 369/283

Primary Examiner—Ellis P. Robinson
Assistant Examiner—P. J. Ryan
Attorney, Agent, or Firm—Sixbey, Friedman, Leedom & Ferguson

[57] ABSTRACT

An information recording medium has such a structure that a disc-shaped substrate is provided with a hole at its central part, an inner-side non-recording zone is provided around the periphery of said hole, an outer-side non-recording zone is provided inside the outer periphery of the substrate, a recording zone is provided between both non-recording zones on the substrate, and a flexible disc-shaped resin film having a hole at its central part is joined to each of the non-recording zones on the substrate in such a state that the resin film is substantially not in contact with the recording zone on the substrate to form a gas layer over the recording zone. A process for producing the recording the medium is also disclosed.

8 Claims, 1 Drawing Sheet

INFORMATION RECORDING MEDIUM AND PROCESS FOR PRODUCING THE SAME

BACKGROUND OF THE INVENTION

1. Field of the Invention

This relates to an information recording medium and a process for producing the same. More particularly, it relates to an information recording medium wherein a disc-shaped resin film is joined to a disc-shaped substrate and a process for producing the same.

2. Description of Prior Art

Information recording medium using high-energy-density beams such as laser beam have been developed and put to practical use in recent years. The information recording medium is called optical disc and can be used in the fields of video disc, audio disc and disc memory for large-capacity static image files and large-capacity computers. The optical disc which is put to practical use can be classified into a reproduction type and a Direct-Read-After-Write (DRAW) type.

Conventional DRAW type optical disc basically comprises a recording layer provided on a disc-shaped transparent substrate of a plastic material, glass, etc. An undercoat layer or intermediate layer composed of a polymer is sometimes provided on the surface (on which the recording layer is provided) of the substrate from the viewpoints of improving the smoothness of the substrate, the adhesion of the substrate to the recording layer and the sensitivity of the optical disc. Further, it is necessary to protect the recording layer from external influences, because it is susceptible to external influences. The writing of information on the recording layer is done, for example, by irradiating a recording medium with laser beam. Recording is done by the physical or chemical change of the irradiated portions of the recording layer. As a method for recording information on the recording layer, there is known a heat mode recording wherein the recording layer is irradiated with laser beam to evaporate a recording material, thus providing pits. Japanese Patent Publication No. 59(1984)-5115 discloses that a disc-shaped resin film is joined to one side (on which the recording layer is provided) of the substrate in an information recording medium, wherein the recording layer is protected, for recording information by the heat mode recording. In the heat mode recording, it is desirable to provide a space for oxygen required for the combustion of a recording material or for diffusion of the evaporated gas of the recording material in the formation of the pits. In the above Patent Publication, the resin film is in contact with the recording layer provided on the substrate, so that there is provided no space. Thus, the recording medium described in the above Patent Publication is unsuitable for use in forming pits by the irradiation of low-energy laser beam.

In order to solve the above problems, there has been proposed a technique in which a transparent protective film having protruded and recessed parts formed on one side thereof is provided on the recording layer side of the substrate in such a manner that the protruded and recessed surface is brought into contact with the recording layer to thereby form a space between the recording layer and the film (see, Japanese Patent Provisional Publication No. 59(1984)-36339). The protruded part of the transparent film is in contact with the recording layer. However, the recessed part thereof is not in contact with recording layer. Thus, when the recording layer is irradiated with laser beam to form the pits, there is a difference in the combustion and evaporation of the recording material between the part where a space is formed by the recording layer and the recess, and the part where the recording layer is in contact with the protruded part. Accordingly, difference and unevenness in recording characteristics therebetween are likely caused.

SUMMARY OF THE INVENTION

It is an object of the present invention to provide an information recording medium which enables satisfactory recording to be made by the irradiation of low-energy laser beam and does not cause unevenness in recording.

It is another object of the present invention to provide a process for producing an information recording medium which is free from the above problems associated with the prior arts.

The present invention provides an information recording medium having such a structure that a disc-shaped substrate is provided with a hole at its central part, an inner-side non-recording zone is provided around the periphery of said hole, an outer-side non-recording zone is provided inside the outer periphery of the substrate, a recording zone is provided between both non-recording zones on the substrate, and a flexible disc-shaped resin film having a hole at its central part is joined to each of said non-recording zones on the substrate in such a state that the film is substantially not in contact with the recording zone on the substrate to form a gas layer over the recording zone.

Further, the present invention provides a process for producing an information recording medium which comprises steps of:

depositing an adhesive in the form of a ring on each of non-recording zones on a disc-shaped substrate;

placing a disc-shaped resin film upon the recording zone-side of the substrate to form a laminate in such a manner that the resin film is spaced away from the recording zone on the substrate; and heating thus formed laminate under pressure to melt or soften and spread the adhesive while the resin film is spaced away from the recording zone on the substrate to join the resin film to the non-recording zones on the substrate so as to from a gas layer between the resin film and the recording zone on the substrate.

DETAILED DESCRIPTION OF THE INVENTION

Figure 1:
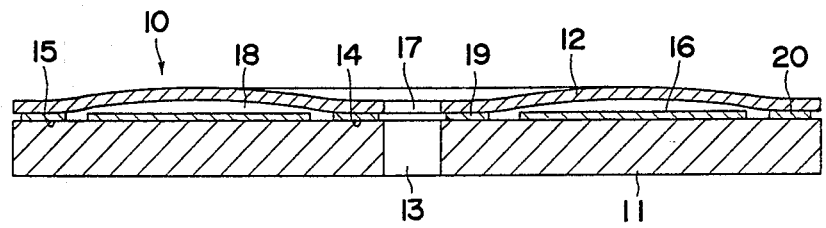
FIG. 1 is a sectional view showing an embodiment of an information recording medium according to the present invention.

The present invention will be described in more detail by referring to the accompanying drawings. FIG. 1 shows a typical embodiment of an information recording medium according to the present invention.

Referring to FIG. 1, an information recording medium 10 according to the invention has such a structure that a disc-shaped resin film 12 is joined to a disc-shaped substrate 11.

The substrate 11 is provided with a hole 13 at its central part. An inner-side non-recording zone 14 is provided around (outside) the periphery of the hole 13 and an outer-side non-recording zone 15 is provided inside the outer periphery of the substrate. A recording zone 16 is provided between both non-recording zones. The resin film 12 has a hole 17 at its central part and is flexible. The resin film 12 is joined to the substrate 11 at the joint area 19 of the non-recording zone and at the joint area 20 of the non-recording zone while producing the pressure of gas (e.g., air pressure, etc.) in a gas layer 18 (e.g., an air layer, etc.) without bringing the resin film 12 into contact with the surface of the recording zone 16 on the substrate 11.

In the information recording medium 10 of the invention, the resin film 12 is arranged such that the resin film is not brought into contact with the recording zone by keeping the tension of the resin film 12 by the air pressure of the air layer 18.

Figure 2:
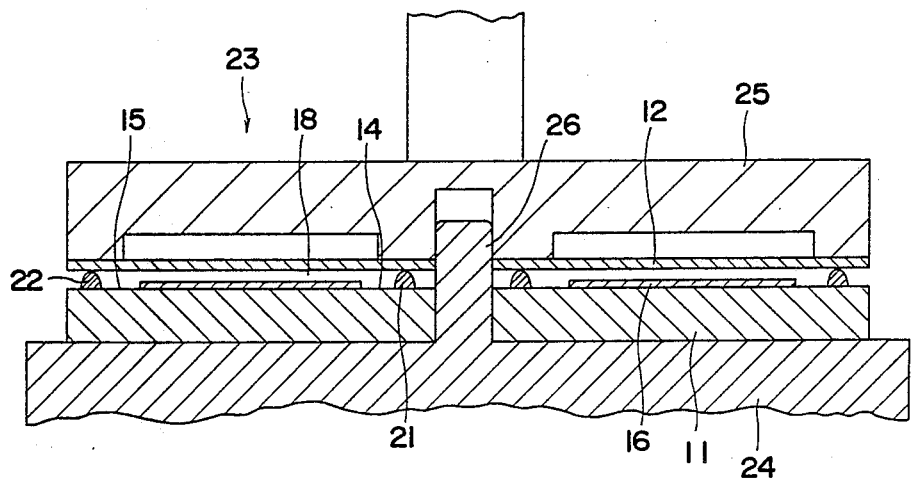
FIG. 2 is a sectional view for showing a manufacturing process of an information recording medium according to the present invention.

Referring to FIG. 2, the substrate 11 has a hole at its central part. The inner-side non-recording zone 14 is provided around the periphery of the hole and the outer-side non-recording zone 15 is provided inside the outer periphery of the substrate. The recording zone 16 is provided between both non-recording zones. The resin film 12 is provided with a hole at its central part and is flexible. A hot-melt adhesive 21 is deposited in the form of a ring on the inner-side non-recording zone 14 of the substrate 11 by means of a hot-melt dispenser, etc. In the same manner, a hot-melt adhesive 22 is deposited in the form of a ring on the non-recording zone 15. The resin film is put upon the surface side (on which the recording zone 16 is provided) of the substrate 11 in such a manner that the resin film 12 is spaced away from the recording zone 16 on the substrate 11. Since the hot-melt adhesives 21 and 22 are deposited on the non-recording zones 14 and 15, respectively, the resin film 12 is separated from the recording zone 16 on the substrate 11.

The centering rod 26 of a heat bonding machine 13 is inserted into the hole 13 of the substrate 11 and the hole 17 of the resin film 12, and the laminate composed of the substrate 11 and the resin film 12 is placed between the receiving tool 24 of the heat bonding machine 23 and the heater block 25 thereof for heat-bonding in such a manner that the resin film 12 and the heater block 25 are opposed to each other. The parts (which face the non-recording zones) of the resin film 12 are heated by the heater block 25 under pressure to melt or soften and spread the hot-melt adhesives 21 and 22 while the resin film 12 is spaced away from the recording zone 16 on the substrate, thus joining the resin film to the non-recording zones so as to form a gas layer (generally an air layer) between the resin film and the recording layer on the substrate. It is desirable that each of the hot-melt adhesives 21 and 22 coated on the disc-shaped substrate has roughly semicircular cross section. The thickness of the coated adhesive is generally in the range of 50 $\mu$m to 2 mm, preferably 100 $\mu$m to 1 mm.

The hot-melt adhesive comprises a thermoplastic resin, a tackifier, wax, etc. Optionally, the adhesive may contain an antioxidant, a filler, etc. The blending ratio of these ingredients varies depending on workability and required properties. Examples of the thermoplastic resin include ethylene-vinyl acetate copolymer, polyamides, polyesters, etc. Examples of the tackifier include rosin, rosin derivatives, pinene resins, hydrocarbon resins, etc. Examples of the wax include paraffin wax, microcrystalline wax, low-molecular polyethylene wax, modified wax, etc.

While a preferred embodiment for the production of the information recording medium according to the invention has been described above, the present invention is by no means limited thereto and modifications can be made in the embodiment described without departing from the scope of the invention.

For example, the disc-shaped resin film joined to the disc-shaped substrate may have an outer diameter smaller than that of the substrate and larger than that of the recording zone. In this case, it is desirable that the outer diameter of the resin film is smaller by at least 0.1 mm than that of the substrate. The hole of the resin film has a diameter larger than that of the hole of the substrate and smaller than the inner diameter of the recording zone. It is desirable that the diameter of the hole of the resin film is larger by at least 0.1 mm than that of the hole of the substrate.

When the outer diameter of the resin film joined to the substrate is smaller than that of the substrate, the resin film is not interlocked with any external members in the non-joined part of the film to the substrate and hence the recording medium is easy to handle. When the inner diameter of the resin film is larger than that of the substrate, the film is not interlocked with spindle in the non-joined part of the film to the substrate. Thus, there is greatly reduced the possibility in that the resin film is peeled off from the substrate and the joining of the resin film to the substrate is well kept over a long period of time. Hence, the recording medium is easy to handle.

The resin film and the substrate may be put upon each other and the laminate may be then placed on the receiving tool. Alternatively, the resin film and the substrate may be put upon each other directly on the receiving tool.

The joining of the resin film to the substrate may be carried out by any conventional means including said heat bonding machine.

The joints of the resin film to the substrate form the non-recording zones. Before the bonding of the resin film, a recording material for the recording layer may be provided all over the surface of the substrate in the range of from the periphery of the hole to the outer periphery of the substrate and the recording material may exist in the non-recording zones. Namely, the recording zone may be a recordable zone or a zone to be recorded among the zone where the recording layer is formed.

Materials which are conventionally used for the substrate, the recording layer and the resin film an be used for the production of the information recording medium according to the present invention. These matters will be briefly described below.

Materials for the substrate which is used in the present invention can be chosen from among those which are conventionally used for the substrates of the information recording medium. Acrylic resins such as a cell cast polymethyl methacrylate, an injection molded polymethyl methacrylate and polymethyl acrylate; vinyl chloride resins such as polyvinyl chloride and vinyl chloride copolymers; epoxy resins; non-crystalline polyolefin resins; and other synthetic resins such as polycarbonates are preferred as substrate materials from the viewpoints of optical characteristics, surface smoothness, processability, handling properties, long-term stability and manufacturing cost. Among them, polymethyl methacrylate, polycarbonates and epoxy resins are preferred from the viewpoints of dimensional stability, transparency and surface smoothness.

On the surface side of the substrate, on which the recording layer is provided, there may be provided an undercoat layer (and/or an intermediate layer) to improve surface smoothness and adhesion and to prevent the recording layer from being deteriorated.

Examples of materials for the preparation of the undercoat layer and/or the intermediate layer include high-molecular materials such as polymethyl methacrylate, acrylic acid-methacrylic acid copolymer, nitrocellulose, polyetylene, chlorinated polyolefins, polypropylene and polycarbonates; organic materials such as silane coupling agent; and inorganic materials such as inorganic oxides (e.g., $SiO_2$, $Al_2O_3$, etc.) and inorganic fluorides (e.g., $MgF_2$, etc.).

Examples of materials which can be used in the recording layer include metals such as Te, Zn, In, Sn, Zr, Al, Ti, Cu, Ge, Au and Pt; semimetals such as Bi, As and Sb; semiconductors such as Si; alloys of these elements; and mixtures thereof. Further, compounds of these metals semimetals and semiconductors such as sulfides, oxides, borides, silicates, carbides and nitrides and mixtures of these compounds and said metals can be used as the materials for the recording layer. Dyes, combinations of a dye and a polymer, combinations of a dye and the above metal and combinations of a dye and the above semimetal can also be used in the recording layer.

Further, conventional metals, semimetals or compounds may be contained in the recording layer.

The recording layer can be formed on the substrate directly or through an undercoat layer by means of metallizing, sputtering, ion plating or coating. The recording layer may be composed of a single layer or two or more layers. The thickness of the layer is generally in the range of 100 to 5,500 A, preferably 150 to 1,000 A from the viewpoint of optical density required for optical information recording.

On the surface of the substrate (said surface being not provided with the recording layer thereon), there may be provided a thin film composed of an inorganic material (e.g., silicon dioxide, tin oxide or magnesium fluoride) or a polymer material (e.g., a thermoplastic resin or a photo-curable resin) by means of vacuum metallizing, sputtering or coating to enhance abrasion resistance and moisture proofness.

Examples of materials for the preparation of the disc-shaped resin film include thermoplastic resins such as acrylic resins, vinyl chloride resins, polystyrene resins, polyamide resins, polyolefin resins (e.g., polypropylene, polyethylene, etc.), polycarbonates, polyester resins, nylon and polyvinylidene chloride. The thickness of the resin film is generally in the range of 10 to 500 $\mu$m, preferably 50 to 100 $\mu$m.

The disc-shaped resin film may be treated to impart antistatic properties thereto. The antistatic treatment can be made by using a surfactant, an electrically conductive filler, a thin metallic film or a semiconductor film.

As the surfactant, any of cationic surfactants, anionic surfactants, nonionic surfactants and ampholytic surfactants can be used. The surfactant may be incorporated in or coated on the resin film. When the surfactant is coated, it may be coated together with a polymer on the surface of the resin film to form an antistatic layer.

When the electrically conductive filler is used, an inorganic salt, a silicon compound, a metal oxide powder, indium oxide, tin oxide, antimony oxide, a compound thereof or a mixture thereof may be incorporated in the resin film. Alternatively, said material may be coated together with a polymer on the surface of the resin film to form an antistatic layer. When the thin metallic film is provided, it can be formed on the surface of the resin film by means of vacuum metallizing, sputtering or ion plating.

When the semiconductor film is provided, it can be formed on the surface of the resin film by means of vacuum metallizing, sputtering or ion plating. The antistatic layer may be provided on at least one side of the resin film. Alternatively, the inside of the resin film may be subjected to the antistatic treatment.

In the information recording medium of the present invention, a gas layer is formed between the substrate and the resin film and the gas layer serves as a space in which the evaporated gas of the recording material is diffused during the formation of the pits. Thus, the information recording medium is suitable for use in recording information by the irradiation of low-energy laser beam.

There is no portion where the resin film is in contact with the substrate in the recording zone, so that unevenness in recording characteristics is not caused and substantially uniform recording characteristics can be obtained. Further, since the tension of the resin film is kept by the pressure of the gas layer, the recording layer is hardly marred by the resin film.

In the production of the information recording medium of the present invention, the adhesive deposited on the non-recording zones of the substrate is molten or softened and spread so than when the substrate and the resin film are put upon each other, the resin film can be joined to the substrate without causing the gas in the previously formed gas layer to leak out.

I claim:

1. An information recording medium having such a structure that a disc-shaped substrate is provided with a hole at its central part, an inner-side non-recording zone is provided around the periphery of said hole, an outer-side non-recording zone is provided inside the outer periphery of the substrate, a recording zone is provided between both non-recording zones on the substrate, and flexible disc-shaped resin film having a hole at its central part is joined to each of the non-recording zones on the substrate in such a state that the resin film is spaced away from and does not contact the recording zone on the substrate to form a gas layer over the recording zone.

2. The information recording medium as claimed in claim 1, wherein the disc-shaped resin film joined to the disc-shaped substrate has an arc cross section in the part facing the recording zone.

3. The information recording medium as claimed in claim 1, wherein the disc-shaped resin film is provided with a hole at its central part, said hole having a diameter larger than that of the hole of the substrate and smaller than the inner diameter of the recording zone on the substrate.

4. The information recording medium as claimed in claim 1, wherein the hole of the disc-shaped resin film joined to the disc-shaped substrate has a diameter larger than that of the hole of the substrate and smaller than the inner diameter of the recording zone on the substrate, and the disc-shaped resin film has an outer diameter smaller than that of the substrate and larger than that of the recording zone on the substrate.

5. A process for producing an information recording medium which comprises the steps of:

depositing a hot melt adhesive in the form of a ring having a thickness of 50 μm to 2 mm on each of the non-recording zones on a disc-shaped flat substrate, said substrate being provided with a hole at its central part, one of said non-recording zones being provided outside the periphery of the hole, the other of said non-recording zones being provided inside the outer periphery of the substrate and said substrate being provided with a recording zone between both non-recording zones;

putting a flexible disc-shaped resin film having a hole at its central part upon the recording zone-side of the substrate and the adhesive deposited in the form of a ring, to form a gas layer between the resin film and the recording zone on the substrate in such a manner that the resin film is spaced away from and does not contact the recording zone on the substrate; and heating the resin film under pressure to melt or soften and spread the hot melt adhesive while the resin film is spaced away from and does not contact the recording zone on the substrate without causing the gas in the formed gas layer to leak out, to join the resin film to the non-recording zones, and to keep the gas layer between the resin film and the recording zone on the substrate.

6. The process for producing an information recording medium as claimed in claim 5, wherein said process further comprises the step of:

placing the resin film and the recording zone between the receiving tool of a heat bonding machine and a heater block thereof, said machine being provided with the receiving tool and the heater block for heatbonding in such a manner that the resin film and the heater block are opposed to each other; and the heating step includes heating the non-recording zone-facing parts of the film under pressure by the heater block.

7. The process for producing an information recording medium as claimed in claim 5, wherein the hot-melt adhesive deposited on the disc-shaped substrate has a roughly semicircular cross section.

8. The information recording medium as claimed in claim 1, wherein the disc-shaped resin film joined to the disc-shaped substrate has an outer diameter smaller than that of the disc-shaped substrate and larger than that of the recording zone on the substrate.

* * * * *